Dec. 18, 1934.  E. G. PURDY  1,984,546
MOTOR VEHICLE
Filed April 7, 1931  2 Sheets-Sheet 1
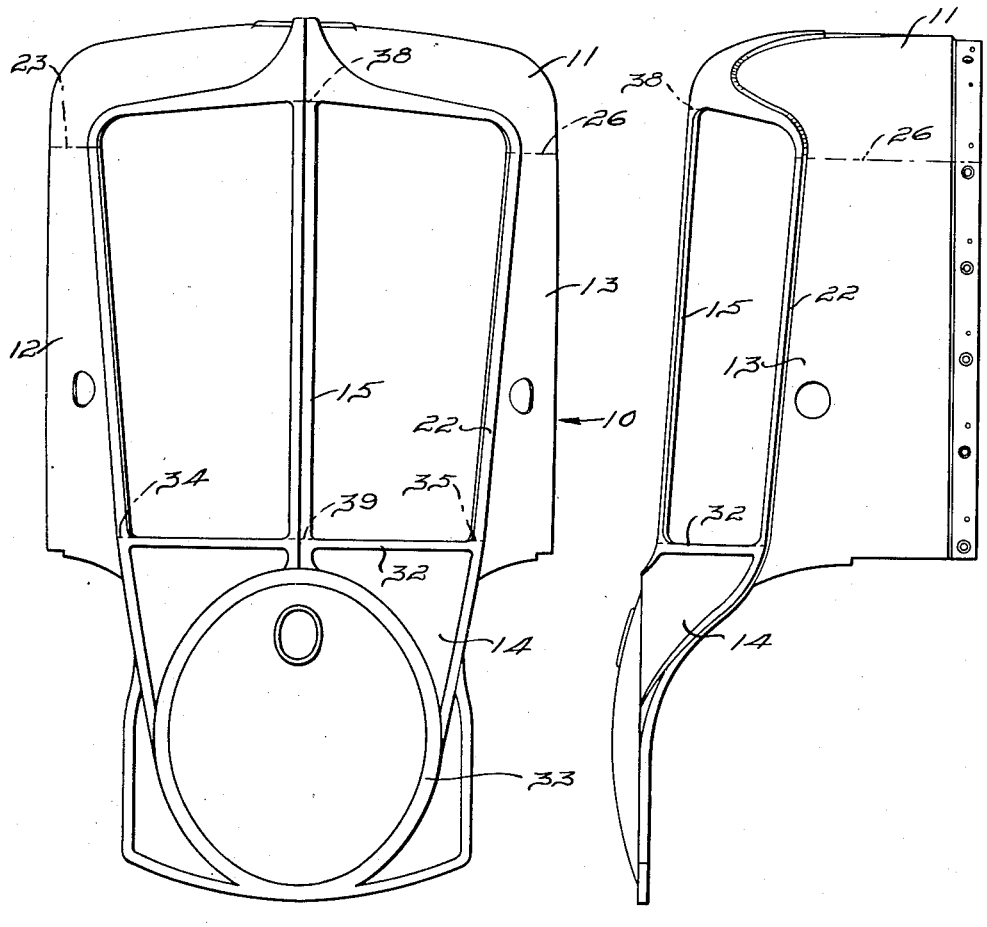
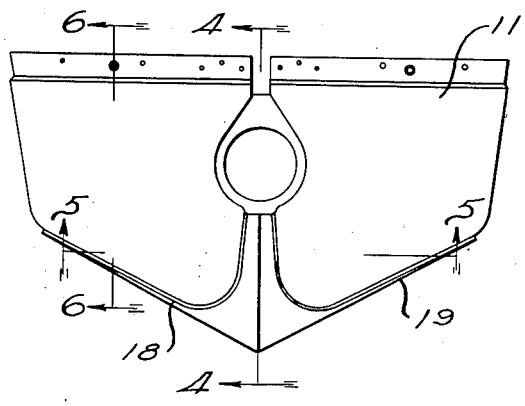
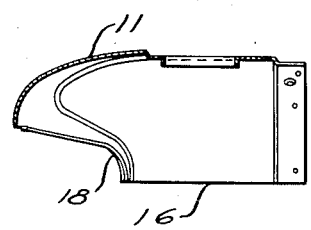
INVENTOR
Emmett G. Purdy.
BY
Harness, Dickey, Pierce & Hann,
ATTORNEYS.

Dec. 18, 1934.     E. G. PURDY     1,984,546
MOTOR VEHICLE
Filed April 7, 1931     2 Sheets-Sheet 2
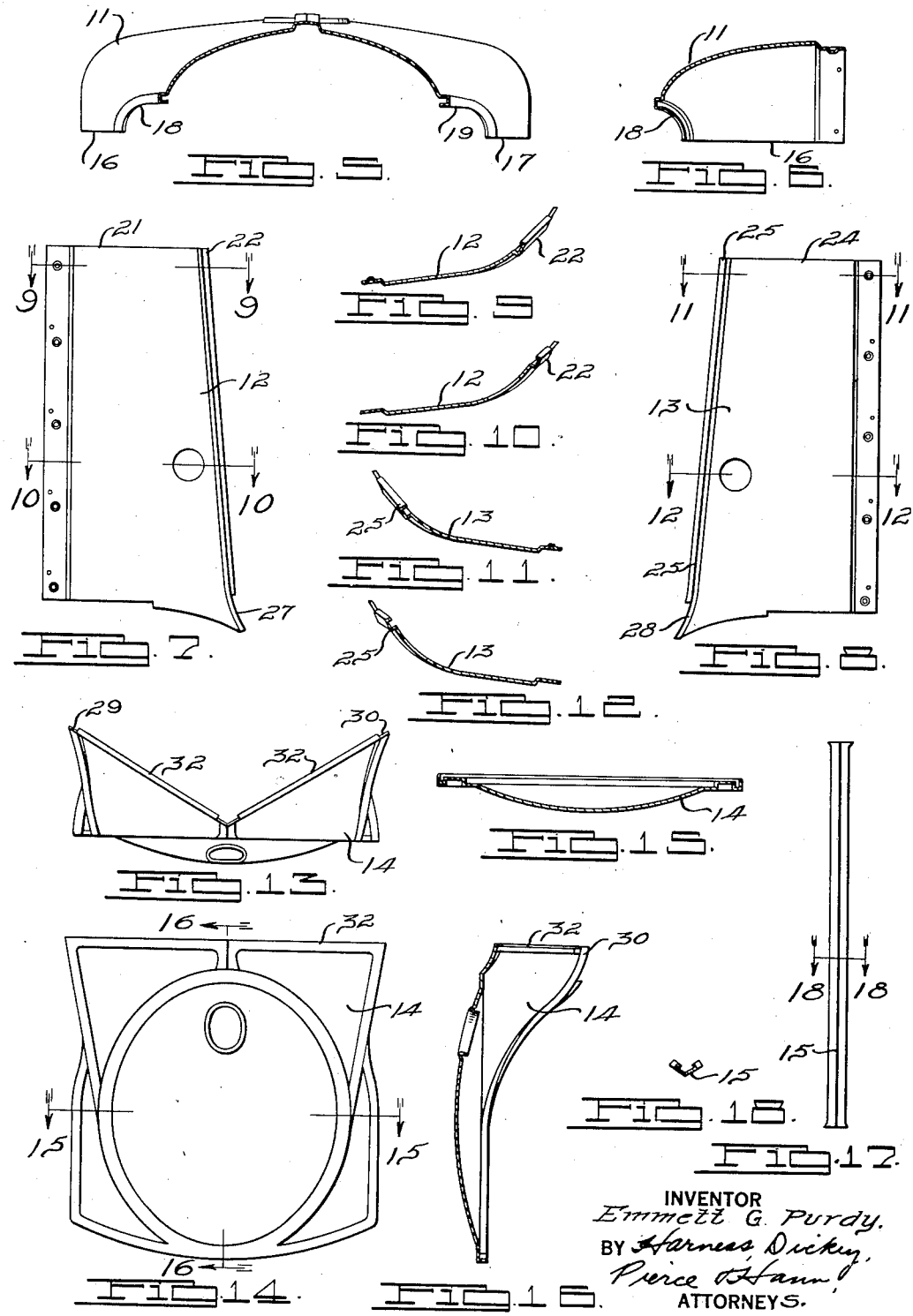
INVENTOR
Emmett G. Purdy.
BY Harness Dickey,
Pierce & Hann
ATTORNEYS.

Patented Dec. 18, 1934

1,984,546

UNITED STATES PATENT OFFICE 1,984,546

MOTOR VEHICLE

Emmett G. Purdy, Detroit, Mich., assignor to Detroit Body Die Company, a corporation of Michigan Application April 7, 1931, Serial No. 528,336

1 Claim. (Cl. 180—69)

This invention relates to motor vehicles and it has particular relation to a radiator shell therefor.

One object of the invention is to provide a radiator shell for a motor vehicle which is integrally associated with a transmission cover for the motor.

Another object of the invention is to provide a radiator shell comprising a plurality of parts rigidly associated together.

Another object of the invention is to provide a radiator shell which can be manufactured from sheet metal in a very inexpensive manner.

Prior to the invention, radiator shells for motor vehicles were drawn from a single sheet of metal and then a large portion of the metal around and centrally of the shell had to be removed and discarded as waste. Moreover, the width and depth of the curved radiator shells now employed are of such proportions, that it is impractical to construct a shell from a single sheet of material, because it is necessary to draw the metal progressively many times thereby not only weakening the shell, but requiring many operations and dies for effecting its manufacture.

In constructing a radiator shell, according to this invention, little or no waste is incurred and little drawing of the metal is required. The shell is constructed of individual parts, individually preformed and then rigidly associated in a unitary construction. Owing to the shape of the individual parts, little more than bending of the metal is required, thereby avoiding the use of many expensive dies. Moreover, the invention contemplates integrally associating a transmission cover with the radiator shell which may not only serve as a cover for the transmission, but as a means for enhancing the appearance of the vehicle.

For a better understanding of the invention, reference may now be had to the accompanying drawings, in which:

Fig. 1 is a front elevational view of a radiator shell constructed in accordance with my invention.

Fig. 2 is a side elevational view of the construction shown by Figure 1.

Fig. 3 is a plan view of the construction shown by Figure 1, illustrating however, only the top panel thereof.

Fig. 4 is a cross-sectional view taken substantially along line 4—4 of Figure 3.

Fig. 5 is a cross-sectional view of a top panel of a radiator shell taken substantially along line 5—5 of Figure 3.

Fig. 6 is a cross-sectional view taken substantially along line 6—6 of Figure 3.

Fig. 7 is an elevational view of one side panel of the radiator shell.

Fig. 8 is an elevational view of the other side panel of the shell.

Fig. 9 is a cross-sectional view taken substantially along line 9—9 of Figure 7.

Fig. 10 is a cross-sectional view taken substantially along line 10—10 of Figure 7.

Fig. 11 is a cross-sectional view taken substantially along line 11—11 of Figure 8.

Fig. 12 is a cross-sectional view taken along line 12—12 of Figure 8.

Fig. 13 is a plan view of the bottom panel of the radiator shell, constituting the transmission cover.

Fig. 14 is an elevational view of the bottom panel shown by Fig. 13.

Fig. 15 is a cross-sectional view taken substantially along line 15—15 of Fig. 14.

Fig. 16 is a cross-sectional view taken substantially along line 16—16 of Fig. 14.

Fig. 17 is an elevational view of a supporting member embodied in the radiator shell, and Fig. 18 is a cross-sectional view of the supporting member, taken substantially along line 18—18 of Figure 17.

In the embodiment of the invention disclosed in Fig. 1, a radiator shell 10 is provided by separately forming a top panel 11, side panels 12 and 13, a bottom panel 14 adapted to be employed as a transmission cover, and a supporting member 15 in any well known manner such as by using a stamping machine. As best shown in Fig. 5, the top panel 11 is provided with horizontal, lower, side edges 16 and 17 and channel bead portions 18 and 19 between such side edges. An upper edge 21 and a channel shape side bead portion 22 of the side panel 12 are positioned in complementary relation to the edge 16 and the bead portion 18 of the top panel, as indicated at 23 in Fig. 1 and then similarly, an upper edge 24 and bead portion 25 of the side panel 13 are positioned in complementary relation to the edge 17 and the bead portion 19 of the top panel as indicated at 26. The side panels 12 and 13 are then rigidly secured to the top panel 11 by welding. Lower side edge portions 27 and 28 of the side panels 12 and 13 respectively, co-act complementarily with side edge portions 29 and 30 of the bottom panel 14. Intermediate its side edges the panel 14 has a curved plate portion 33 adapted to be employed as a cover for the transmission.

A bead 32 on the bottom panel between the side edges 29 and 30 co-acts complementarily with the bead portions 22 and 25 of the side panels, thus forming an endless bead on the front of the shell 10. The bottom panel 14 is welded to the side panels 12 and 13, as indicated at 34 and 35 of Figure 1, and then the supporting member 15 is positioned with its ends in abutting relation to the top and lower panels 11 and 14, as indicated at 38 and 39 respectively in Fig. 1, and then is welded to these points to the panels.

It should be understood that the panels 11, 12, 13 and 14 are individually preformed by suitable dies, and that the manufacture of each panel requires little or no drawing of the metal because each panel is of such contour that little more than bending of the metal is required. Forming the panels in this manner and then welding them thereafter eliminates many operations which would be required if the entire shell were drawn from a single sheet of metal. Moreover, less equipment is required in manufacturing the shell in this manner. Welding the individual parts is of course a relatively simple operation. Also, by forming the individual parts, less waste is incurred, since in forming a shell from a single sheet of metal, a large central section of metal would have to be finally removed. Associating a transmission cover with the radiator shell not only facilitates mounting the cover on the vehicle, but results in a new construction of radiator shell having an improved appearance.

Although only one form of the invention has been illustrated and described in detail, it will be apparent to those skilled in the art that it is not so limited, but that various modifications may be made therein without departing from the spirit of the invention or from the scope of the appended claim.

I claim:

A radiator shell for motor vehicles comprising a plurality of metal panels, including a top panel, a bottom panel, a pair of side panels, and a supporting member, said supporting member having a predetermined formation produced by bending the metal thereof and being disposed intermediate the side panels, each individual panel having a predetermined formation produced by bending and but slightly drawing the metal thereof and provided with portions complementary with adjacent portions of other panels and of said member, and welded connections for joining such complementary portions to form a unitary structure.

EMMETT G. PURDY.